(12) United States Patent
Kawano (10) Patent No.: US 7,980,801 B2
(45) Date of Patent: Jul. 19, 2011

(54) SCREW

(75) Inventor: Hiroshi Kawano, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 508 days.

(21) Appl. No.: 11/628,346

(22) PCT Filed: Jun. 2, 2005

(86) PCT No.: PCT/JP2005/010136
§ 371 (c)(1),
(2), (4) Date: Dec. 1, 2006

(87) PCT Pub. No.: WO2005/121568
PCT Pub. Date: Dec. 22, 2005

(65) Prior Publication Data
US 2007/0228743 A1   Oct. 4, 2007

(30) Foreign Application Priority Data

Jun. 10, 2004   (JP) ................................. 2004-173020

(51) Int. Cl.
*F16B 23/00* (2006.01)
(52) U.S. Cl. ............... 411/402; 411/5; 411/82; 411/399
(58) Field of Classification Search ............... 411/5, 82, 411/396, 399, 402, 910, 930, 369, 371.1
See application file for complete search history.

(56) References Cited

U.S. PATENT DOCUMENTS

| | | | | |
|---|---|---|---|---|
| 1,677,269 A * | 7/1928 | Burghart | ............................ | 411/5 |
| 2,213,630 A * | 9/1940 | Gade | ............................ | 411/396 |
| 2,394,812 A * | 2/1946 | Seitz | ............................ | 411/5 |
| 2,884,099 A * | 4/1959 | Nenzell | ............................ | 411/548 |
| 3,087,370 A * | 4/1963 | Iaia | ............................ | 411/369 |
| 3,226,140 A * | 12/1965 | Voegeli | ............................ | 403/272 |
| 3,719,792 A * | 3/1973 | Cuccaro | ............................ | 219/230 |
| 4,884,929 A * | 12/1989 | Smith et al. | ............................ | 411/3 |
| 5,681,135 A * | 10/1997 | Simonson | ............................ | 411/5 |
| 5,857,816 A * | 1/1999 | Assmundson | ............................ | 411/1 |
| 6,361,258 B1 * | 3/2002 | Heesch | ............................ | 411/178 |
| 6,464,442 B1 * | 10/2002 | Stingl | ............................ | 411/390 |
| 6,679,667 B2 * | 1/2004 | Brown et al. | ............................ | 411/377 |
| 6,843,153 B1 * | 1/2005 | Rawson-Harris | ............................ | 81/120 |

(Continued)

FOREIGN PATENT DOCUMENTS

JP           52-93871          7/1977

(Continued)

*Primary Examiner* — Flemming Saether
(74) *Attorney, Agent, or Firm* — Harness, Dickey & Pierce, P.L.C.

(57) ABSTRACT

A screw characterized by having a screw body having a male screw portion to be screw fastened into a corresponding screw hole and a top hat portion that is integrally formed to be conjoined to one end of the male screw portion and having a top end surface formed thereon; a torque transmission means that is used for transmitting to the top hat portion the running torque required for screw fastening the male screw portion into the screw hole and having a base end surface formed to correspond to the form of the top end surface of the top hat portion; and an adhesive solidification layer that bonds the top end surface of the top hat portion and the base end surface of the torque transmission means to mechanically couple the top hat portion and the torque transmission means.

6 Claims, 4 Drawing Sheets

U.S. PATENT DOCUMENTS 7,014,403 B1 * 3/2006 Higganbotham et al. ........ 411/5

FOREIGN PATENT DOCUMENTS

| JP | 63-141315 U | 9/1988 |
| JP | 04-128560 | 11/1992 |
| JP | 11-325041 A | 11/1999 |
| JP | 2002-250329 A | 9/2002 |
| JP | 2003-074531 | 3/2003 |
| JP | 2004-501328 A | 1/2004 |
| WO | 01/98675 A1 | 12/2001 |

* cited by examiner

SCREW

BACKGROUND OF THE INVENTION

1. Technical Field

The present invention relates to a screw that is not provided with a fastening means such as a fastening recess on the body head.

Priority is claimed on Japanese Patent Application No. 2004-173020, filed Jun. 10, 2004, the content of which is incorporated herein by reference.

2. Background Art

Conventionally, a screw is widely used as a means for joining structural members of a given device. As a means for fastening a screw, a recess such as a plus (+)-shaped "cross recess" or a minus (−)-shaped "slot" is ordinarily formed in the top portion of the screw head, so that fitting a screwdriver having a corresponding tip shape in the recess applies running torque to the screw.

However, a screw that is fastened in a structural element can be readily loosened with a screwdriver having a tip shape that corresponds to the recess. This characteristic is extremely unsuitable when disadvantages arise by loosening of screws by a third party that have been attached in a formal process, for example, when not removing screws serves as a condition for a product warranty.

For this reason, the use of recesses including general shapes such as a cross recess or a slot or the like is conventionally avoided, with screws provided with a specially shaped recess on the top portion of the screw head being used. However, if there is a person in possession of a screwdriver having a tip shape that corresponds to the special recess, then the possibility remains that the screw will be loosened. Therefore, it can be said to be impossible to completely prevent a screw loosening operation due to tampering or the like simply with a recess shape contrivance.

In order to solve such problems, a "security screw" has been proposed as disclosed for example in Patent Document 1. This security screw has a tab for screw fastening that cannot be separated by hand, with the tab being formed in advance on the top portion of the screw head by methods such as integral molding, welding or adhesion and the like. After completion of the screw fastening operation with respect to a structural member, the tab is capable of being separated by a simple tool such as a driver, wrench or pliers. That is, by removing the tab of this security screw after the screw fastening operation, the means (tab) for screw loosening, which serves as a cause for tampering or the like, is proactively eliminated.

Patent Document 1: Japanese Unexamined Patent Application, First Publication No. 2003-074531

BRIEF SUMMARY OF THE INVENTION

Problems to be Solved by the Invention

However, in the aforementioned security screw, since traces of removal of the tab remain on the top portion of the screw head following removal of the tab, the aesthetic appearance of the screw itself, or the device to which the screw is attached is greatly marred. Of course, aesthetic problems similarly remain even in the case of various recesses on the top portion of the screw head such as in conventional ordinary screws.

Also, in such a security screw, the tab removal operation must be performed with a tool, and this operation must be manually performed one by one, with such an operation not being easy by any means.

The main objects to be solved by the present invention are as follows.

Namely, the first object of the present invention is to provide a screw that is capable of preventing a loosening operation by a third party.

The second object of the present invention is to provide a screw that is excellent in appearance and handling.

Other objects of the present invention will be evident from the specification and drawings, and particularly the recitation of the claims.

Means for Solving the Problem

The present invention devises a characteristic means equipped with a screw body having a male screw portion that is formed to be screw fastened into a corresponding screw hole and a top hat portion on which a top end surface is formed; a torque transmission means such as a screw head member that has a base end surface formed to correspond to the form of the top end surface of the top hat portion; and an adhesive solidification layer that bonds the top end surface of the top hat portion and the base end surface of the torque transmission means to mechanically couple them.

Also, stated in concrete terms and in detail, in solving these problems, the present invention adopts the novel, characteristic constitution means extending from a broader concept to a narrower concept enumerated as follows to thereby achieve the aforementioned objects.

That is, the screw according to the present invention includes a screw body having a male screw portion that is formed for being screw fastened into a corresponding screw hole and a top hat portion that is integrally formed to be conjoined to one end of the male screw portion and having a top end surface formed thereon; a torque transmission means that is used for transmitting to the top hat portion the running torque required for screw fastening the male screw portion into the screw hole and having a base end surface formed to correspond to the form of the top end surface of the top hat portion; and an adhesive solidification layer that bonds the top end surface of the top hat portion and the base end surface of the torque transmission means to mechanically couple the top hat portion and the torque transmission means.

Also, in the screw according to the present invention, the top end surface is a flat surface that is formed so as to be perpendicular to the lengthwise direction of the male screw portion.

Furthermore, in the screw according to the present invention, the adhesive solidification layer is a hardened adhesive; and the adhesive has a fracture strength sufficient for transmitting running torque from the torque transmission means to the screw body in a steady state and has a property of being removed from the top end surface of the top hat portion when a predetermined heat treatment is performed to expose the top end surface to the outside.

Furthermore, in the screw according to the present invention, the adhesive has a property of exfoliating from the surface of an adherend by application of a warm water heat treatment.

Furthermore, in the screw according to the present invention, the torque transmission means is a screw head member that has a tool coupling region that is formed to be coupleable in correspondence with a predetermined torque generating tool.

Furthermore, in the screw according to the present invention, the torque transmission means is a screw head member that is provided with a mechanical form in which a predetermined running torque is applied to the torque transmission means in accordance with a manual operation.

Furthermore, in the screw according to the present invention, the screw head member is provided with: an intermediate joint member that has a base end surface formed to correspond to the form of the top end surface of the top hat portion; and a universal joint member that is provided between the screw head member and the intermediate joint member to enable the screw head member and the intermediate joint member to bend with respect to each other and rotate in an interlocked manner.

Furthermore, in the screw according to the present invention, the top hat portion is provided with an upper-half region expansion taper portion forming a truncated cone shape in which a diameter of the upper half region at an outer circumferential portion of the top hat portion is set to gradually become larger than a maximum diameter of the male screw portion.

Furthermore, in the screw according to the present invention, the top hat portion is provided with a cylindrical lower-half region neck portion that is formed between the screw body and the upper-half region expansion taper portion.

Furthermore, in the screw according to the present invention, a waterproof packing is attached at a conjoining region of the upper-half region expansion taper portion and the lower-half region neck portion of the top hat portion.

Furthermore, in the screw according to the present invention, the lower-half region neck portion has a diameter equivalent to the maximum diameter of the male screw portion.

Advantageous Effects of the Invention

As described above, the screw according to the present invention mechanically couples a top end surface that is formed on a top hat portion that is conjoined to one end of the male screw portion and a torque transmission means such as a screw head member or the like that has a base end surface that is formed to correspond to the form of the top end surface of the top hat portion by means of an adhesive solidification layer that exfoliates from the surface of an adherend by being subjected to a predetermined heat treatment with warm water or the like. For this reason, after screw fastening the male screw portion into a screw hole, by coating or spraying warm water on the adhesive solidification layer of the screw or immersing the adhesive solidification layer in warm water, the adhesive solidification layer is readily and cleanly removed from the top end surface of the top hat portion so that the top end surface is exposed to the outside. At this time, it is more preferable if water ingress into the screw hole is prevented using a waterproof packing. As a result, a screw is obtained that is excellent in appearance and handling and that can reliably prevent a loosening operation by a third party.

Also, according to the present invention, it is possible to freely constitute screws of various embodiments, such as making the mode of the aforementioned torque transmission means be a mechanical member including a tool coupling member, an intermediate joint member and a universal bending and rotating member, or replacing the aforementioned screw head member or the tool coupling member with a manual torque generation member.

DESCRIPTION OF THE REFERENCE SYMBOLS $\alpha, \beta, \gamma, \delta, \epsilon$: screw
1: screw body
11: male screw portion
12: top end surface
13: top hat portion
13a: upper-half region expansion taper portion
13b: lower-half region neck portion
2, 2a: screw head member (torque transmission means)
2b friction grooves
21: cross recess
22, 22a: base end surface
23: intermediate joint member
24: universal joint
3: adhesive solidification layer
4: waterproof packing
5: structural member
6: screw hole
7: screwdriver-shaped screw head member (torque transmission means)
71: body handle portion
72: rotation shaft
73: tip portion
74: base end surface
8: tab-shaped screw head member (torque transmission means)
81: protruding grip portion
82: base portion
83: base end surface
9: ultrasonic driver
91: friction material DETAILED DESCRIPTION OF THE INVENTION INCLUDING BEST MODE FOR CARRYING OUT THE INVENTION Embodiments of the screw according to the present invention shall be described in detail as the first through fourth embodiments, referring to the drawings.

First Embodiment

Figure 1:
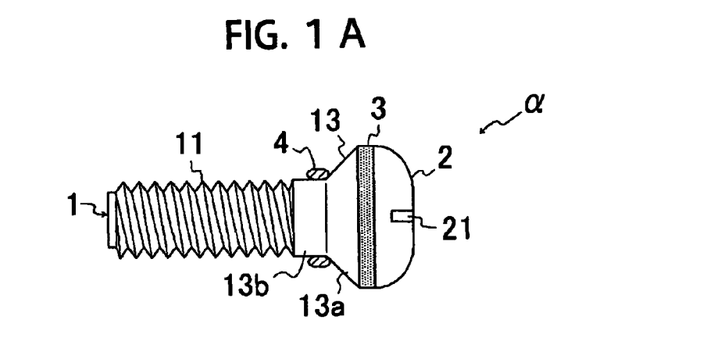
FIG. 1A is a partial sectional side view showing the outline configuration of the screw according to a first embodiment of the present invention.
FIG. 1B is a partial sectional side view showing the dismantled state of the screw shown in FIG. 1A.
FIG. 1C is a front view showing the top hat portion of the screw shown in FIG. 1A and FIG. 1B.
FIG. 1D is a front view showing the screw head member of the screw shown in FIG. 1A and FIG. 1B.

A first embodiment shall first be described using FIG. 1A to FIG. 1C.

FIG. 1A to FIG. 1D are drawings showing the outline configuration of the screw according to the first embodiment of the present invention. FIG. 1A is a partial sectional side view of the screw; FIG. 1B is a partial sectional side view showing the dismantled state of the screw shown in FIG. 1A; FIG. 1C is a front view showing the top hat portion of the screw shown in FIG. 1A and FIG. 1B; and FIG. 1D is a front view showing the screw head member of the screw shown in FIG. 1A and FIG. 1B.

As shown in FIG. 1A, a screw α according to the present embodiment basically includes a screw body 1, a screw head member 2, an adhesive solidification layer 3, and a waterproof packing 4.

Among these, the screw body 1 is constituted by being provided with a male screw portion 11 in which a male screw for screw fastening into a corresponding screw hole (described below) is formed; and a top hat portion 13 that is integrally formed to be conjoined to one end of the male screw portion 11 and having a top end surface 12 formed thereon. The top end surface 12 is formed in a circular planar shape along the orthogonal plane in the lengthwise direction of the male screw portion 11. The top hat portion 13 of the present embodiment is provided with: an upper-half region expansion taper portion 13a forming a truncated cone shape in which the diameter of the upper half region at the outer circumferential portion of the top hat portion 13 is set to gradually become larger than the maximum diameter of the male screw portion 11; and with a cylindrical lower-half region neck portion 13b that is interposed between the male screw portion 11 and the upper-half region expansion taper portion 13a and having a diameter that is set to be equivalent to the maximum diameter of the male screw portion 11. Also, the O-ring-shaped waterproof packing 4 including various synthetic resin materials such as synthetic rubber is attached to the conjoining region of the upper-half region expansion taper portion 13a and the lower-half region neck portion 13b of the top hat portion 13.

Also, the screw head member 2 is a torque transmission means that is used for transmitting to the top hat portion 13 the running torque required for screw fastening the male screw portion 11 into the screw hole. A tool coupling region that is capable of corresponding coupling with a torque generating tool that generates a predetermined running torque, such as a screwdriver (not illustrated), is formed in the screw head member 2. Here, a "cross recess" (plus recess) 21 is provided as an example of the tool coupling region. Also, a base end surface 22 is formed on the screw head member 2 in a planar shape corresponding to the form of the top end surface 12 of the top hat portion 13.

The adhesive solidification layer 3 bonds the top end surface 12 of the top hat portion 13 and the base end surface 22 of the screw head member 2 to each other and thereby functions so as to mechanically couple them. This adhesive solidification layer 3 is formed by solidifying an adhesive that has predetermined characteristics. Specifically, in a steady state it has a fracture strength sufficient for transmitting running torque generated at the side of the screw head member 2 to the side of the screw body 1 and is capable of being removed from the top end surface 12 of the top hat portion 13 when subjected to a predetermined heat treatment to expose the top end surface 12 to the outside.

In particular, it is preferable that the adhesive for forming the adhesive solidification layer 3 have a property of being readily and cleanly removable from the surface of an adherend by exfoliating therefrom as a result of being subjected to a predetermined heat treatment with warm water or the like. For example, "ECOSEPARA" (product name), an epoxy-based resin adhesive made by Kaken Tech Co., Ltd., is suitable as one that satisfies this requirement.

The tool coupling region formed in the screw head member 2 may be a slot (minus recess), a square hole, a hexagonal hole, or other recess instead of the cross recess 21 that is illustrated. Also, instead of a recess, the front face of the screw head member 2 itself may be formed in a square or hexagonal shape to be capable of corresponding coupling with a torque generating tool such as a spanner or wrench (not illustrated).

Also, the present example illustrated the top hat portion 13 as forming a saucer-shaped flange shape (screw head shape of a flat countersunk head screw), but the top hat portion 13 may have a flat flange shape (screw head shape of a flat screw), and, depending on the case, the diameter thereof may be set to be equivalent to the maximum diameter constituted by the outermost periphery of the screw thread of the male screw portion 11. Also, the top end surface 12 has a circular planar shape along the orthogonal plane in the lengthwise direction of the male screw portion 11, but is not limited thereto, and may, for example, have the shape of a convex curve or a concave curve. Depending on the shape and specifications of the structural member (described below) that has the screw hole, the shape (form) of the top end surface 12 may be appropriately modified. In such a case, it goes without saying that the base end surface 22 of the screw head member 2 is made to have a shape that corresponds to the top end surface 12. That is, a condition for obtaining the constitution of the present invention is that the top end surface 12 that is formed so that the adhesive solidification layer 3 is obtained is present at a given region conjoining one end of the male screw portion 11.

The manner of using the screw α constituted as described above shall now be explained.

Figure 2:
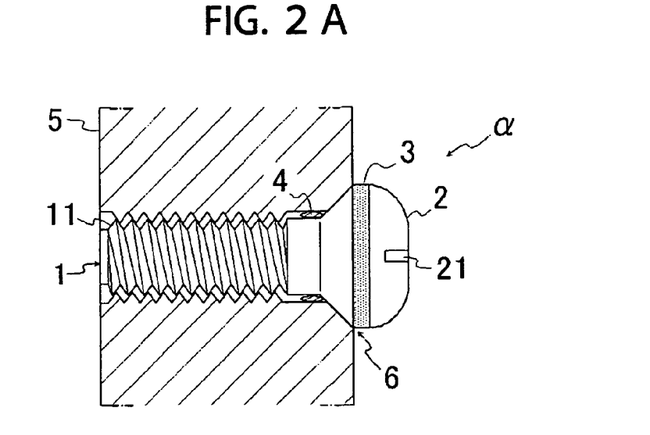
FIG. 2A is a partial sectional side view showing the state of the screw shown in FIG. 1 screw fastened into a structural member.
FIG. 2B is a partial sectional side view showing the dismantled state of the screw shown in FIG. 2A.
FIG. 2C is a partial sectional side view showing the state of having exposed the top hat portion of the screw shown in FIG. 2B.

FIG. 2A to FIG. 2C are explanatory drawings showing in order the manner of using the screw α shown in FIG. 1. FIG. 2A is a partial sectional side view showing the state of the screw shown in FIG. 1 screw fastened into a structural member; FIG. 2B is a partial sectional side view showing the dismantled state of the screw shown in FIG. 2A; and FIG. 2C is a partial sectional side view showing the state of having exposed the top hat portion of the screw shown in FIG. 2B.

First, as shown in FIG. 2A, when using the screw α according to the present embodiment, similarly to the case of conventional screws, the male screw portion 11 is screw fastened into a screw hole 6 of a structural member 5 in the state of the tip of a torque generating tool such as a screwdriver (not illustrated) fitted into the cross recess 21 of the screw head member 2. At this time, since the adhesive solidification layer 3 has a fracture strength sufficient for transmitting running torque generated at the side of the screw head member 2 to the side of the screw body 1 in a steady state, the predetermined screw fastening is suitably performed no differently from a conventional screw. Also, the waterproof packing 4 that is attached in the conjoining region of the male screw portion 11 of the screw body 1 and the flange-shaped top hat portion 13 is closely fitted between this conjoining region and the opposing inner circumferential surface of the screw hole 6 while undergoing a reduction in volume by its own elastic force.

Next, as shown in FIG. 2B, in the state of having achieved the screw fastening of the male screw portion 11 of the screw body 1 with the screw hole 6 of the structural member 5, warm water (about 90° C. in the case of ECOSEPARA) is coated or sprinkled on the entire region of the adhesive solidification layer 3 including the screw head member 2, or else this region is immersed in warm water. Due to the characteristics of the adhesive that forms the adhesive solidification layer 3, the adhesive solidification layer 3 readily exfoliates from the top end surface 12 of the top hat portion 13 of the screw body 1 and the base end surface 22 of the screw head member 2. At this time, the warm water attempts to penetrate into the screw hole 6 through small gaps formed by the top hat portion 13 of the screw body 1 and the screw hole 6 of the structural member 5. However, the ingress of the warm water is effectively prevented by the waterproof packing 4 that is attached in the conjoining region of the male screw portion 11 of the screw body 1 and the top hat portion 13 (that is, the conjoining region of the upper-half region expansion taper portion 13a and the lower-half region neck portion 13b).

Then, as shown in FIG. 2C, the aforementioned adhesive solidification layer 3 is cleanly removed from the top end surface 12 of the top hat portion 13 of the screw body 1, so that the top end surface 12 comes to be exposed to the outside. As a result, the screw α, in the state of having been fastened to the screw hole 6 of the structural member 5, is not only excellent in appearance and handling during heat treatment, but has a form of being able to reliably prevent a loosening operation by a third party.

The screw head member 2 that has been once separated from the screw body 1 in the above manner can be repeatedly used semi-permanently by constituting the screw α by setting the adhesive solidification layer 3 again with another screw body (1). The present constitution is therefore an extremely outstanding one from the standpoint of recycling.

Second Embodiment

Figure 3A:
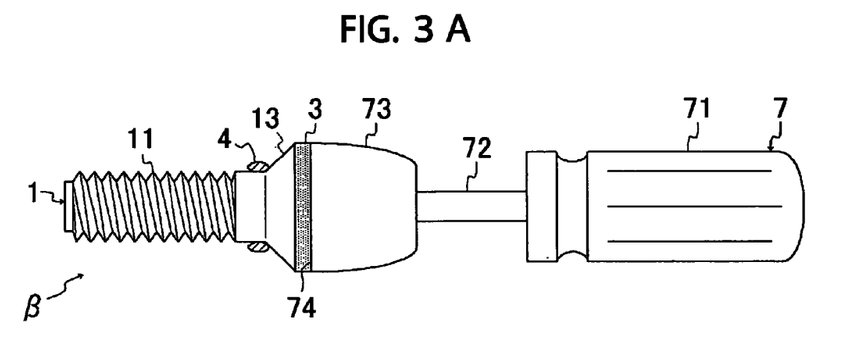
FIG. 3A is a side view showing the outline configuration of the first example of the screw according to a second embodiment of the present invention.
Figure 3B:
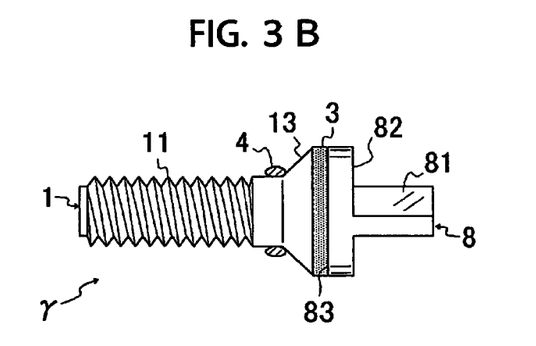
FIG. 3B is a side view showing the outline configuration of the second example of the screw according to the second embodiment of the present invention.

Next, FIG. 3A and FIG. 3B show outline configurations of a first example and a second example of the screw according to a second embodiment of the present invention. Constituent elements shown in these drawings that are identical or equivalent to those already shown in FIG. 1 shall be given the same reference numerals and detailed explanations thereof shall be omitted (the same also applying to other drawings).

First, FIG. 3A shows a constitutional example of the screw β according to the first example of the second embodiment that adopts a screwdriver-shaped screw head member 7 as a torque transmission means that is provided with a mechanical mode capable of generating a predetermined running torque in accordance with a manual operation. That is, the screwdriver-shaped screw head member 7 is composed of a body handle portion 71, a rotation shaft 72 that is connected thereto, and a distal end tip portion 73 thereof, similarly to an ordinary screw driver (not illustrated). The running torque that is generated by the manual operation of the body handle portion 71 is transmitted from the body handle portion 71 to the tip portion 73 at the distal end of the rotation shaft 72.

Here, similarly to the screw head member 2 in the aforementioned first embodiment, the tip portion 73 is provided with a base end surface 74 that is formed in a planar shape to correspond to the form of the top end surface 12 of the top hat portion 13. Therefore, by interposing the adhesive solidification layer 3 between the top hat portion 13 of the screw body 1 and the base end surface 74, the screw β, which is directly coupled to a screwdriver, is obtained that has the same function and mode as that of the first embodiment.

On the other hand, FIG. 3B shows a constitutional example of a screw γ according to the second example that adopts a tab-shaped screw head member 8 as a torque transmission means provided with the aforementioned mechanical mode. That is, this tab-shaped screw head member 8 is constituted from a protruding grip portion 81 and a base portion 82 that is positioned at the base end thereof. The running torque that is generated by manual operation of the protruding grip portion 81 is thereby directly transmitted to the base portion 82 at the base end of the protruding grip portion 81.

Here, similarly to the screw head member 2 in the aforementioned first embodiment, the base portion 82 is provided with a base end surface 83 that is formed in a planar shape to correspond to the form of the top end surface 12 of the top hat portion 13. Therefore, by interposing the adhesive solidification layer 3 between the top hat portion 13 of the screw body 1 and the base end surface 83, the screwy γ, which is directly coupled to a tab, is obtained that has the same function and mode as that of the first embodiment.

Since it becomes unnecessary to separately prepare a torque generating tool such as a screwdriver for the screw β, which is directly coupled to a screwdriver, and the screw γ, which is directly coupled to a tab, similarly to when using the screw α of the first embodiment, a convenient manner of use can be achieved. Of course, the screwdriver-shaped screw head member 7 and the tab-shaped screw head member 8 of the screw β and the screw γ, respectively, can be repeatedly used semi-permanently similarly to the screw head member 2 of the first embodiment.

Third Embodiment

Figure 4:
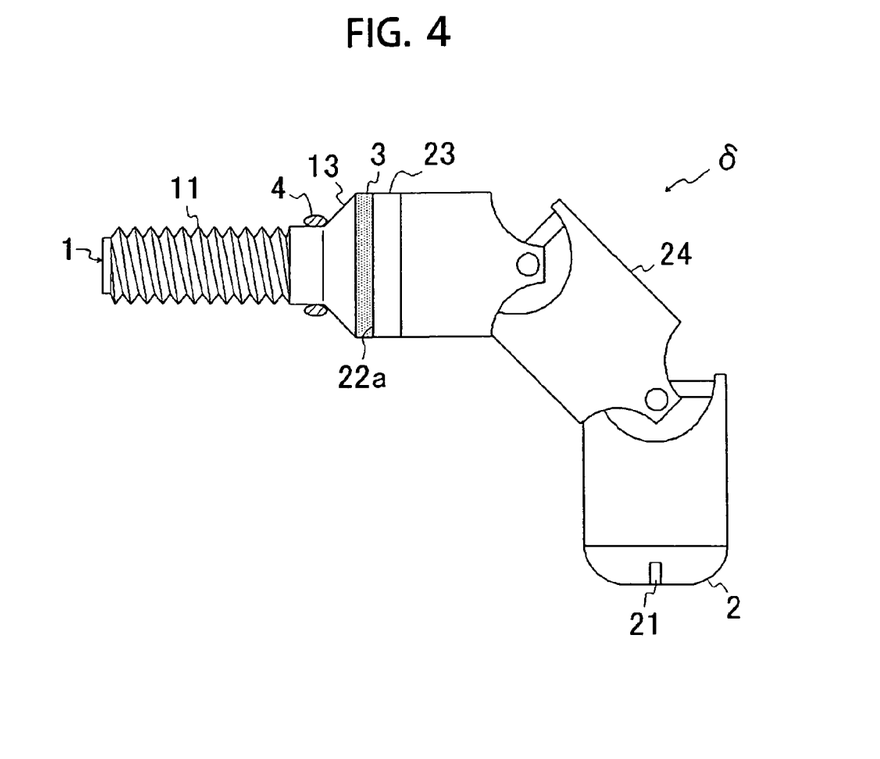
FIG. 4 is a side view showing the outline configuration of the screw according to a third embodiment of the present invention.

FIG. 4 next shows the outline configuration of the screw according to a third embodiment of the present invention.

As shown in the drawing, in the screw δ according to the third embodiment, the screw head member 2 (provided with the cross recess 21) that is similar to that used in the aforementioned first embodiment has a composite constitution that is provided with an intermediate joint member 23 that constitutes a predetermined base end surface 22a that is corresponds to the form of the top end surface 12 of the top hat portion 13; and a universal joint 24 as a universal bending and rotating member that is interposed between itself (the screw head member 2) and the intermediate joint member 23 and thereby mechanically couples them to freely bend and rotate in an interlocked manner. The adhesive solidification layer 3 is disposed between the top end surface 12 of the top hat portion 13 and the base end surface 22a of the intermediate joint member 23.

Even in a situation in which a torque generating tool such as a screwdriver (not illustrated) cannot be suitably positioned along the axial direction of the screw body 1, this screw δ of a universal bending and rotating type can perform the predetermined screw fastening operation from another direction. Of course, the composite constitution of the screw head member 2 of this screw δ can be repeatedly used semi-permanently.

As the aforementioned universal bending and rotating member, it is possible to apply, for example, a screw coil-type flat wound spring (not illustrated) or the like in place of the exemplified universal joint 24 in a similar manner. Also, it is possible to substitute the screw head member 2 with one having a mechanical mode that is capable of generating a predetermined running torque in accordance with a manual operation, such as the screwdriver-shaped screw head member 7 or the tab-shaped screw head member 8 exemplified in the second embodiment described above.

Fourth Embodiment

Figure 5:
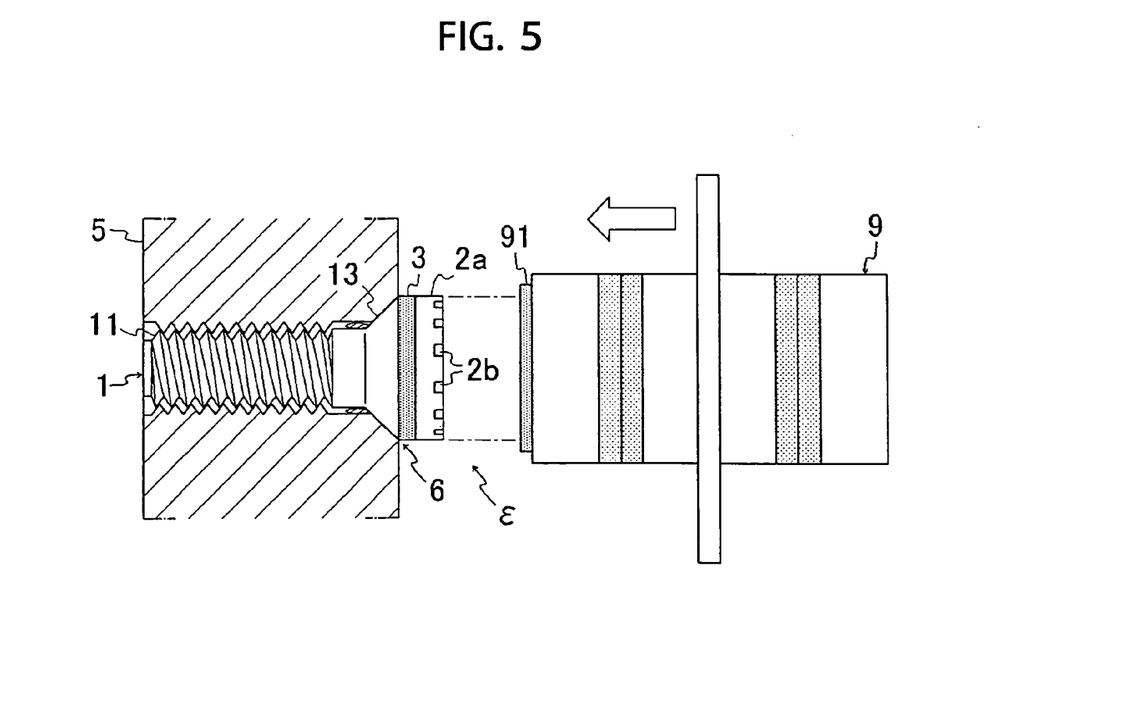
FIG. 5 is a partial sectional side view showing the outline configuration of the screw according to a fourth embodiment of the present invention.

FIG. 5 shows the outline configuration of the screw according to a fourth embodiment of the present invention.

As shown in the drawing, a screw ϵ according to the present fourth embodiment is one showing a constitutional example in the case of using an ultrasonic driver (screwdriver) 9 as a torque generating tool. That is, a screw head member 2a as a torque transmission means to be applied to this screw ϵ is constituted to have a plurality of friction grooves 2b that are formed by being radially machined in an area facing a friction material 91 that is provided on the end surface of the ultrasonic driver 9. This screw head member 2a may be constituted from various materials, with other functional constitutions all being the same as those of the first embodiment described above. Of course, the screw head member 2a of this screw ϵ can also be repeatedly used semi-permanently similarly to the screw head member 2 of the first embodiment.

Here, the ultrasonic driver 9 is one that has a characteristic of generating extremely powerful running torque in proportion to the frictional force of the rotation application region. For this reason, if fastening of the screw ϵ is performed by this ultrasonic driver 9, the male screw portion 11 of the screw body 1 obtains an extremely secure screw fastening with the screw hole 6 of the structural member 5 due to the frictional force enhancement action of the screw head member 2a that is equipped with the plurality of friction grooves 2b.

As a result, after the screw head member 2a and the adhesive solidification layer 3 that generate a high frictional force on the surface have exfoliated by warm water, even if a loosening operation is attempted with the same ultrasonic driver 9, it is no longer possible to obtain frictional force exceeding a predetermined value on the top hat portion 13 (top end surface 12) of the screw body 1 that is firmly screw fastened into the screw hole 6. That is, even assuming possession of the ultrasonic driver 9, it becomes impossible to remove the screw body 1, and so here the screw ϵ that is capable of reliably preventing a loosening operation by a third party is obtained.

While preferred embodiments of the present invention have been described and illustrated above, the present invention is not limited to these embodiments and can be widely applied. Additions, omissions, substitutions, and other modifications can be made without departing from the spirit or scope of the present invention. Accordingly, the present invention is not to be considered as being limited by the foregoing description, and is only limited by the scope of the appended claims.

INDUSTRIAL APPLICABILITY

The screw according to the present invention can favorably perform a fastening operation when, for example, joining given members to be fastened, is excellent in appearance and handling, and can reliably prevent a loosening operation by a third party.

The invention claimed is:

1. A screw comprising:
    a screw body having a male screw portion that is formed for being screw fastened into a corresponding screw hole and a top hat portion that is integrally formed to be conjoined to one end of the male screw portion, the top hat portion having a top end surface formed on one end of the top hat portion, all of the top end surface being a flat surface;
    a screw head member that has: a surface having a slot which corresponds with and is capable of coupling with a torque generating tool, the slot being used for transmitting to the top hat portion a running torque from the torque generating tool that generates the running torque required for screw fastening the male screw portion into the screw hole; and a base end surface formed to correspond to the form of the top end surface of the top hat portion, all of the base end surface being a flat surface; and
    an adhesive solidification layer that bonds the top end surface of the top hat portion and the base end surface of the screw head member to couple the top hat portion and the screw head member,
    wherein the adhesive solidification layer covers all of the top end surface of the top hat portion and all of the base end surface of the screw head member,
    wherein the top hat portion has an upper-half region expansion taper portion having a truncated cone shape, one end of the upper-half region expansion taper portion is the one end of the top hat portion, all of the expansion taper portion gradually becomes larger in diameter toward the one end of the upper-half region expansion taper portion, and
    wherein the adhesive solidification layer is a hardened adhesive, and the adhesive has a fracture strength sufficient for transmitting running torque from the screw head member to the screw body in a steady state and has a property of exfoliating from the top end surface and the base end surface to thereby expose the flat surface of the top end surface to the outside when a warm water heat treatment is applied.

2. The screw according to claim 1, wherein the flat surface of the top end surface is formed so as to be perpendicular to the lengthwise direction of the male screw portion.

3. The screw according to claim 1, wherein the screw head member is provided with
    an intermediate joint member and a universal joint member to enable the screw head member to bend and rotate.

4. The screw according to claim 1, wherein the top hat portion is provided with a cylindrical lower-half region neck portion that is formed between the screw body and the upper-half region expansion taper portion.

5. The screw according to claim 4, wherein a waterproof packing is attached at a conjoining region of the upper-half region expansion taper portion and the lower-half region neck portion of the top hat portion.

6. The screw according to claim 4, wherein the lower-half region neck portion has a diameter equivalent to the maximum diameter of the male screw portion.

* * * * *